United States Patent
Lareau

[15] 3,703,272
[45] Nov. 21, 1972

[54] X-RAY FILM CASSETTE WITH IDENTIFICATION EXPOSURE WINDOW AND EXPOSURE INDICATOR

[72] Inventor: Norman N. Lareau, Fairport, N.Y.

[73] Assignee: Eastman Kodak Company, Rochester, N.Y.

[22] Filed: Nov. 12, 1970

[21] Appl. No.: 89,100

Related U.S. Application Data

[63] Continuation of Ser. No. 765,948, Oct. 8, 1968, abandoned.

[52] U.S. Cl. ..................250/67, 250/65 R, 250/68
[51] Int. Cl. ..............................................G03b 17/26
[58] Field of Search............95/1.1; 250/65 R, 67, 68

[56] References Cited

UNITED STATES PATENTS

| | | | |
|---|---|---|---|
| 2,077,500 | 4/1937 | Townsend et al............ | 250/67 |
| 2,433,129 | 12/1947 | Land........................ | 250/65 X |
| 1,222,531 | 4/1917 | Cooper....................... | 95/1.1 |
| 1,623,534 | 4/1927 | Duhamel.................... | 95/1.1 |
| 1,376,032 | 4/1921 | Ozols....................... | 250/67 X |
| 2,140,525 | 12/1938 | Ginman...................... | 250/67 |
| 1,698,058 | 1/1929 | Martin...................... | 250/68 X |

Primary Examiner—William F. Lindquist
Attorney—R. W. Hampton and Milton S. Sales

[57] ABSTRACT

A film cassette includes a rigid base having a cylindrical film supporting surface and a resiliently curved cover which closes over the cylindrical surface in mating relationship therewith to enclose the film and define flat, rectangular external cassette surfaces. The cassette is provided with an exposure window through which the film can be exposed to patient identification information by photographic projection and a color-coded indicator to give a visual signal when the film has been patient identified. An observation opening may also be provided for positive inspection to ensure the presence of film in the cassette.

4 Claims, 7 Drawing Figures

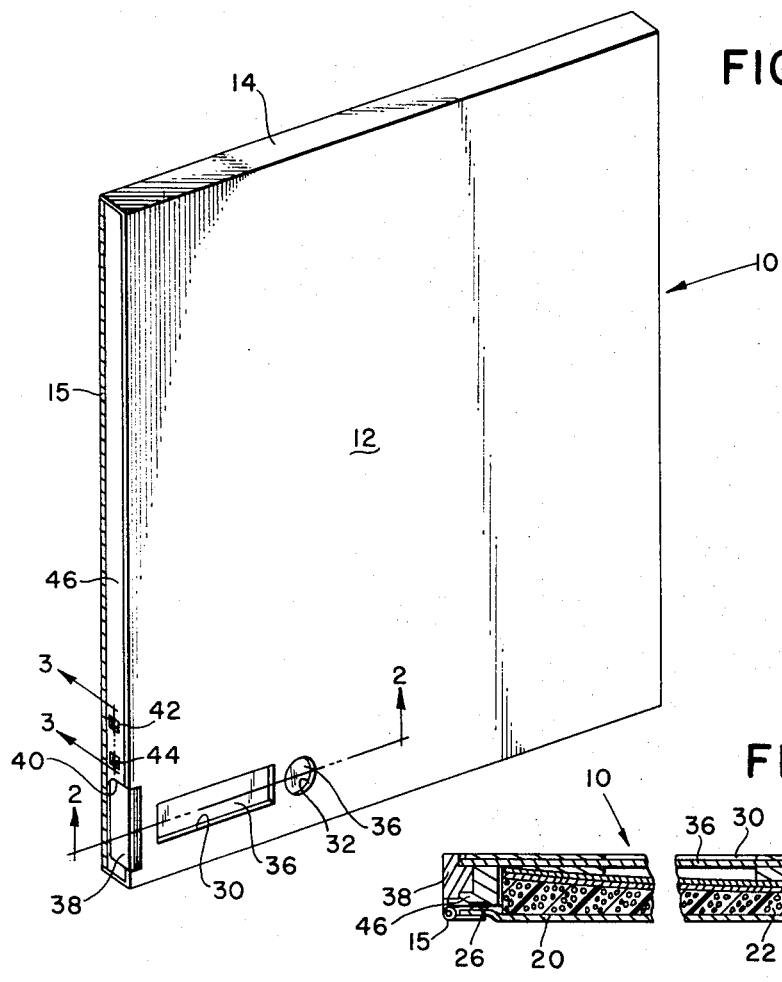
FIG. 1
FIG. 2a
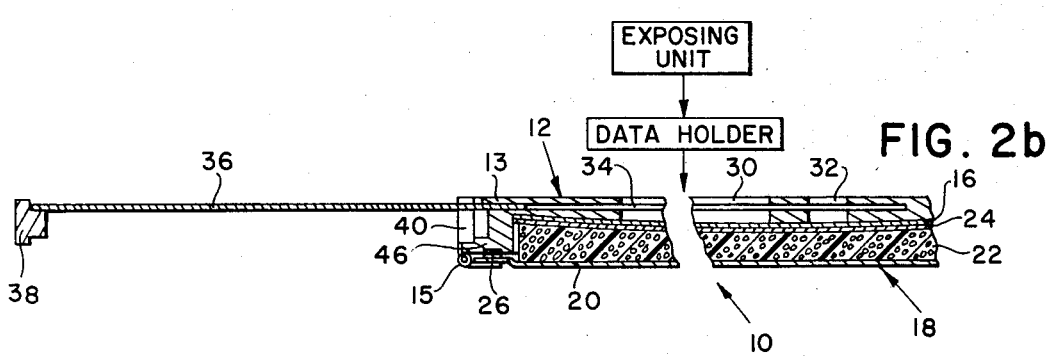
FIG. 2b
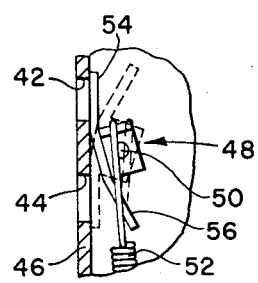
FIG. 3
NORMAN N. LAREAU
INVENTOR.
BY
ATTORNEYS

X-RAY FILM CASSETTE WITH IDENTIFICATION EXPOSURE WINDOW AND EXPOSURE INDICATOR

CROSS REFERENCES TO RELATED APPLICATIONS

This is a continuation of U.S. application Ser. No. 765,948, filed Oct. 8, 1968, now abandoned.

Reference is made to commonly assigned copending U.S. patent application Ser. No. 625,829, now U.S. Pat. No. 3,504,180 entitled X-RAY CASSETTE, filed Mar. 24, 1967 in the name of Fredrick F. Tone.

BACKGROUND OF THE INVENTION

1. Field of the Invention

This invention relates to film cassettes and their use, and more particularly to X-ray film cassettes which are suitable for use in X-ray film exposing units and automatic film unloading and loading machines.

2. Description of the Prior Art

Cassettes for containing X-ray film are well known and commonly comprise a rigid, cylindrical base portion and a flexible, cylindrical cover which cooperate to enclose and support a sheet of X-ray film therebetween. Such cassettes are is disclosed in U.S. Pat. Nos. 3,153,145 to Simon Yerkovich entitled X-RAY FILM CASSETTE and No. 2,077,500 to De Wayne Townsend et al. entitled APPARATUS FOR THE IDENTIFICATION OF X-RAY FILMS CASSETTES of the type shown in the Townsend et al. patent have openable windows in the base portion for applying patient identification information to the underlying sheet of film by contact printing techniques. In these devices, the patient identification information must first be transferred to a transparency which is placed in close proximity to the film and illuminated from above. This is an expensive and time consuming operation, resulting in a need for a patient identification process in which the information can be transferred directly from a typewritten card to the X-ray film.

There is no provision in the prior art devices for a visual indication responsive to a patient identification printer to alert the operator that the film in a cassette has not been identified. This presents the possibility of obtaining a developed film which cannot be traced due to the lack of patient identification.

The cassettes known in the prior art do not have means permitting the operator to check on the presence of film. This presents little problem when the cassettes are manually loaded because there is little chance of using a cassette which does not contain a sheet of film. However, in cassettes designed for use in automatic film unloading and loading machines, there is a possibility that the machine will occasionally malfunction and a cassette will be emitted which does not contain film. Without some method for the operator to check on the presence of film, such a cassette would be used for diagnostic purposes, resulting in lost time and possible harm to the patient's recovery process.

SUMMARY OF THE INVENTION

It is an object of the present invention to provide a film cassette which includes a movable indicator to alert the operator as to whether or not the film has been patient identified. Another object of the present invention is to provide a cassette which may be checked for the presence of film therein.

In accordance with a preferred embodiment of the invention, and X-ray film cassette is formed of a molded base having an openable window through which the film may be exposed to patient identification information by photographic projection from a data holder spaced from the cassette. An observation window is provided in the base which may be opened to visually check for the presence of film.

Another feature of the invention provides for a visual indication on the cassette that the cassette has been processed by a patient identification printer for eliminating the possibility of obtaining a developed film which cannot be traced due to the lack of patient identification. A color-coded, toggle-type indicator is mounted within the cassette adjacent a pair of windows. As the cassette is loaded, the toggle is turned to one position and the operator observes an associated color through one of the windows. During the patient identification process, the toggle is automatically switched to a second position and a different color is thereafter visible in the other window. By checking the color appearing at the windows, the operator can readily determine whether the film has been patient identified.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which:

FIG. 1 is a perspective view showing the base and two sides of the X-ray film cassette of the present invention;

FIG. 2A is an enlarged segmental sectional view taken along line 2—2 of FIG. 1;

FIG. 2B is an enlarged sectional view similar to FIG. 2A with the opaque slide partially withdrawn;

FIG. 3 is an enlarged segmental sectional view taken along line 3—3 of FIG. 1 showing the color-coded toggle-type indicator;

DESCRIPTION OF THE PREFERRED EMBODIMENT

Figure 4:
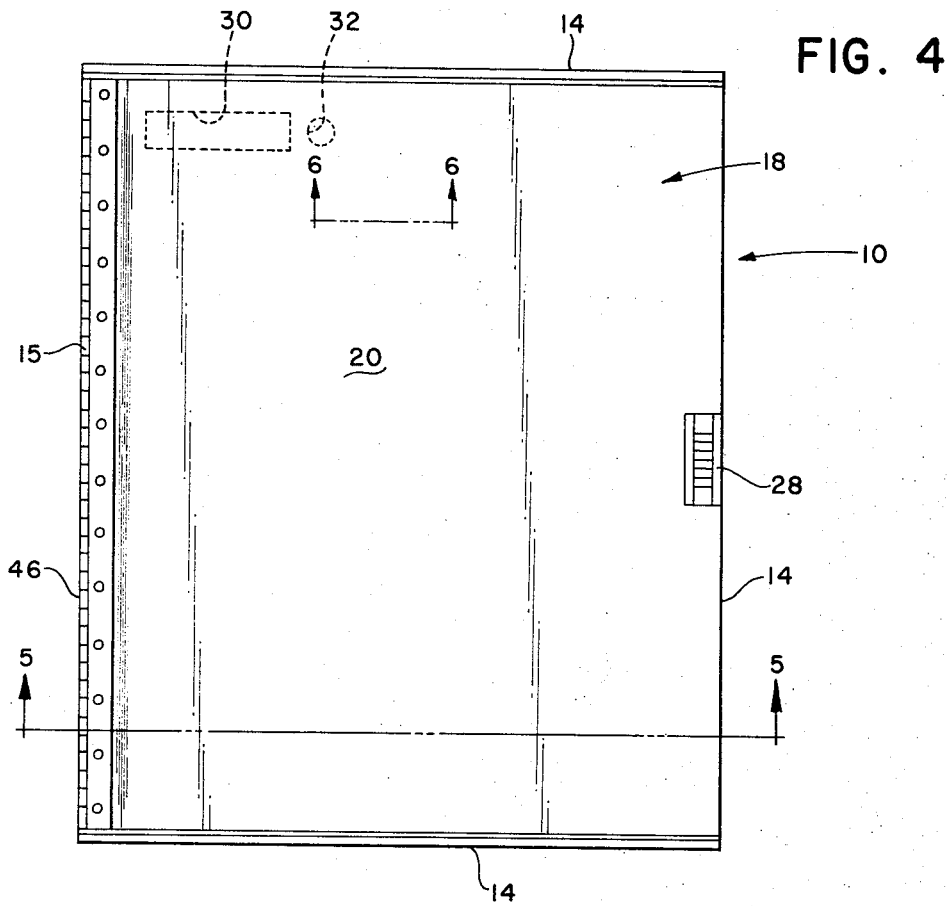
FIG. 4 is a front elevational view showing the cover of the X-ray film cassette of FIG. 1.
Figure 5:
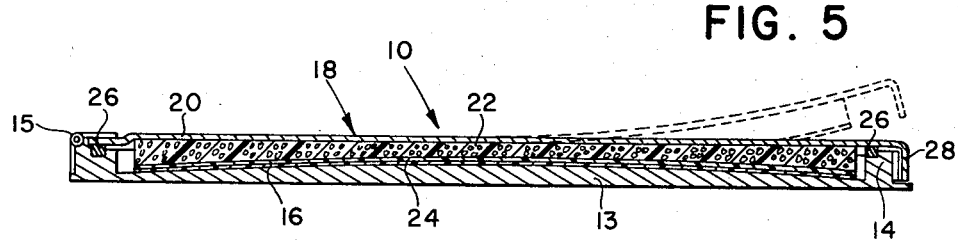
FIG. 5 is a sectional view taken along line 5—5 of FIG. 4.
Figure 6:
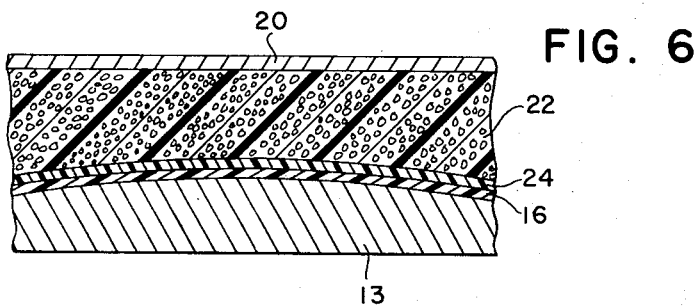
FIG. 6 is a segmental, enlarged sectional view similar to FIG. 5.

Referring to the drawings, there is shown an X-ray film cassette 10 having a molded base 12 of magnesium, aluminum or other suitable material which is transparent to X-rays and has a modulus of elasticity great enough to provide sufficient stiffness to the base. Such material might include non-metallic moldable or castable products such as fiber-filled acrylics. Base 12 has a generally flat central plate 13 and upstanding flanges 14 around the periphery of plate 13 to provide a well or recess for receiving a sheet of film. A hinge 15 is mounted along one of the flanges 14 for attaching a cover to be later described. An intensifying screen 16 is attached to the inner surface of plate 13 while a sheet of lead foil (not shown) may be interposed therebetween. The film supporting or inner surface of plate 13 is curved, and preferably cylindrically shaped with its axis lying in a direction parallel to the axis of hinge 15 and below base 12 as viewed in FIG. 5. The outer surface of plate 13 is molded flat.

A cover 18 is formed of a precurved sheet metal plate 20, one side of which is connected to one of the flanges 14 by hinge 15. A foam pad 22 is attached to the inner surface of plate 20 and carries a second intensifying screen 24. Pad 22 and screen 24 are dimensioned to fit within flanges 14. The relative curves of the inner surface of base 12 and plate 20 are such that when the cover is closed on a sheet of X-ray film, a line contact between the intensifying screens begins at the left or hinged side of the cassette as viewed in FIG. 5 and progresses towards the right to expel the air between the sheet of film and screens 16 and 24. This is important to prevent fluorescent light emitted from the screens when excited by X-rays from diffusing and reaching portions of the film not immediately adjacent the light source. By forming the cassette in the manner described, both outer surfaces assume flat configurations when the cover is closed to ensure smooth, easy handling of the cassette.

A seal 26 is carried in a groove in base 12 completely around the periphery of base 12 to exclude light from the interior of the cassette when cover 18 is closed. A latch 28 is provided to hold cover 18 in the closed position. The latch is preferably positioned entirely within the outline of the cassette and flush with the outer surface to prevent interference with handling processes.

A rectangular shaped exposure window 30 is provided in a corner of base 12 and extends through intensifying screen 16. The location of window 30 is such that it does not interfere with the exposure of the major portion of the film. A second opening 32 in base 12 is aligned with exposure window 30 and slightly spaced therefrom. A slot 34 in base 12 connects the edge of the base with window 30 and opening 32. An opaque slide 36 is slidably carried in slot 34 and attached to a handle 38 which fits into a recess 40 in base 12.

Window 30 is provided for applying patient identification data to the film by photographic projection techniques. Normally, slide 36 is fully inserted in slot 34 as shown in Fig. 2A, thus serving to protect the film from outside light which would cause fogging. When it is desired to add patient identification data to the film by means of photographic projection, the cassette is inserted into a printer which includes a data holder spaced from the cassette position and an exposing unit. The printer may include a mechanism, not shown, for automatically withdrawing slide 36 to the position shown in FIG. 2B. After window 30 is open, the exposing unit projects previously prepared data from the data holder through window 30 onto the film. After exposure, slide 36 is closed and cassette 10 may be removed from the printer.

Film observation opening 32 provides a ready means for checking the cassette to ensure that it contains film. By manually withdrawing slide 36 to an intermediate position in which film observation opening 32 is uncovered while exposure window 30 remains covered, the operator can visually check for the presence of film. Optionally, a detent can be provided to ensure that slide 36 is not withdrawn past its intermediate position, thus eliminating the possibility of exposing the film below exposure window 30.

An important feature of the present invention consists of a visual indicating means best seen in FIGS. 1 and 3 for informing the operator of the condition of the cassette. A pair of windows 42 and 44 are preferably located in one flange 46 of base 12. A toggle-type indicator 48 is rotatably mounted on pivot 50 and is held in either the full line position or the phantom line position shown in FIG. 3 by an off-center tension spring 52. A pair of legs 54 and 56 underlie windows 42 and 44, respectively, depending on the position of toggle indicator 48 so that the operator, by visually checking the windows can readily detect the position of the indicator. Legs 54 and 56 can be differently colored to emphasize the position of the indicator.

In operation, when the cassette is loaded with film by an automatic loading machine which is no part of the present invention and therefore not illustrated, toggle indicator 48 is automatically flipped to one of the illustrated positions by a projection on the machine which extends through one of the windows to indicate that the cassette is loaded and the film is not yet identified. When a patient cassette is placed into the identification printer slide 36 is withdrawn to open window 30 and patient identification information is projected onto the film from a data holder spaced from the cassette. Toggle indicator 48 is moved by an appropriate projection on the printer to its other position. In this manner, the operator can easily determine whether the film has been patient identified by merely observing which color appears in windows 42 and 44.

The invention has been described in detail with particular reference to the preferred embodiment thereof, but it will be understood that variations and modifications can be effected within the spirit and scope of the invention as described hereinabove and as defined in the appended claims.

I claim:

1. A light opaque and X-ray transparent film cassette adapted to receive a sheet of X-ray film which may be exposed with identification data, said cassette comprising:
   a. a base having a recess for receiving said sheet of X-ray film;
   b. a cover adapted to close upon and cooperate with said base for holding said X-ray film in the recess;
   c. means for enabling a portion of said sheet of X-ray film to be exposed with said identification data for identifying said X-ray film, said exposure enabling means including
      1. a window defined by and passing through one of said base and cover, and
      2. means for selectively preventing light from passing through said window;
   d. an indicator within said cassette and at least partially visible from outside said cassette when said cover is closed upon said base, said indicator being movable to a first position when said sheet of film is received in said recess and to a second position when said sheet of film is so identified, whereby the operator can readily determine whether said sheet of film has been identified by visually checking the position of said indicator; and e. window means adjacent said indicator whereby the position of the indicator may be checked by viewing through said window means.

2. A film cassette as defined in claim 1 wherein:

a. said indicator comprises a pivotally mounted toggle having
   1. first and second extending legs,
   2. a first position in which said first leg closely underlies and said second leg is spaced from said window means, and
   3. a second position in which said first leg is spaced from and said second leg closely underlies said window means; and b. said toggle is rotated to
   1. its first position when the cassette is loaded with film which has not been identified, and
   2. its second position when said film is identified.

3. A film cassette as defined in claim 2 wherein said first and second extending legs are different colors whereby the operator can visually determine whether the film has been patient identified by observing the color appearing in said window means.

4. A film cassette as defined in claim 2 wherein said window means comprises a first window adjacent said first leg and a second window adjacent said second leg.

* * * * *